(12) United States Patent
Schilling et al.

(10) Patent No.: US 6,306,293 B1
(45) Date of Patent: *Oct. 23, 2001

(54) STORM DRAIN LINER

(75) Inventors: Michael R. Schilling, Clinton, LA (US); Daniel Paul Corn, Philip Ranch, CA (US)

(73) Assignee: Pactec, Inc., Clinton, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/608,799

(22) Filed: Jun. 30, 2000

Related U.S. Application Data

(63) Continuation of application No. 09/191,358, filed on Nov. 13, 1998, now Pat. No. 6,086,758.

(51) Int. Cl.$^7$ ................. E03F 5/06; B01D 29/27
(52) U.S. Cl. .............. 210/164; 210/232; 210/484; 210/485; 210/489; 404/4
(58) Field of Search ................. 210/163–165, 210/232, 484, 485, 489; 404/4

(56) References Cited

U.S. PATENT DOCUMENTS

| | | | |
|---|---|---|---|
| 2,384,057 | * | 9/1945 | Wetherell . |
| 4,419,232 | * | 12/1983 | Arntyr et al. . |
| 4,720,209 | * | 1/1988 | Iams . |
| 4,793,728 | * | 12/1988 | Ellis . |
| 5,037,541 | * | 8/1991 | Ruey-Jang et al. . |
| 5,958,226 | * | 9/1999 | Fleischmann . |
| 5,985,157 | * | 11/1999 | Leckner et al. . |
| 6,080,307 | * | 6/2000 | Morris et al. . |
| 6,086,758 | * | 7/2000 | Schilling et al. . |
| 6,106,707 | * | 8/2000 | Morris et al. . |
| 6,149,803 | * | 11/2000 | DiLoreto, Jr. et al. . |

* cited by examiner

*Primary Examiner*—David A. Simmons
*Assistant Examiner*—Fred Prince
(74) *Attorney, Agent, or Firm*—Robert C. Tucker; Bernard F. Meroney; Lance A. Foster

(57) ABSTRACT

A drain filtering system is disclosed, comprising a filter placed within a basket which is suspended from frame positioned underneath a drain grate atop the inlet to a storm drain. The filter is constructed from materials which filter out heavy metals and hydrocarbons from the water passing through. The filter also has overflow outlets to prevent back-up of storm water during periods or heavy rain. The basket is constructed from a corrosion resistant material, preferably high density polyethylene which can withstand the extreme pressures exerted by waste and water collected within the filter.

22 Claims, 8 Drawing Sheets

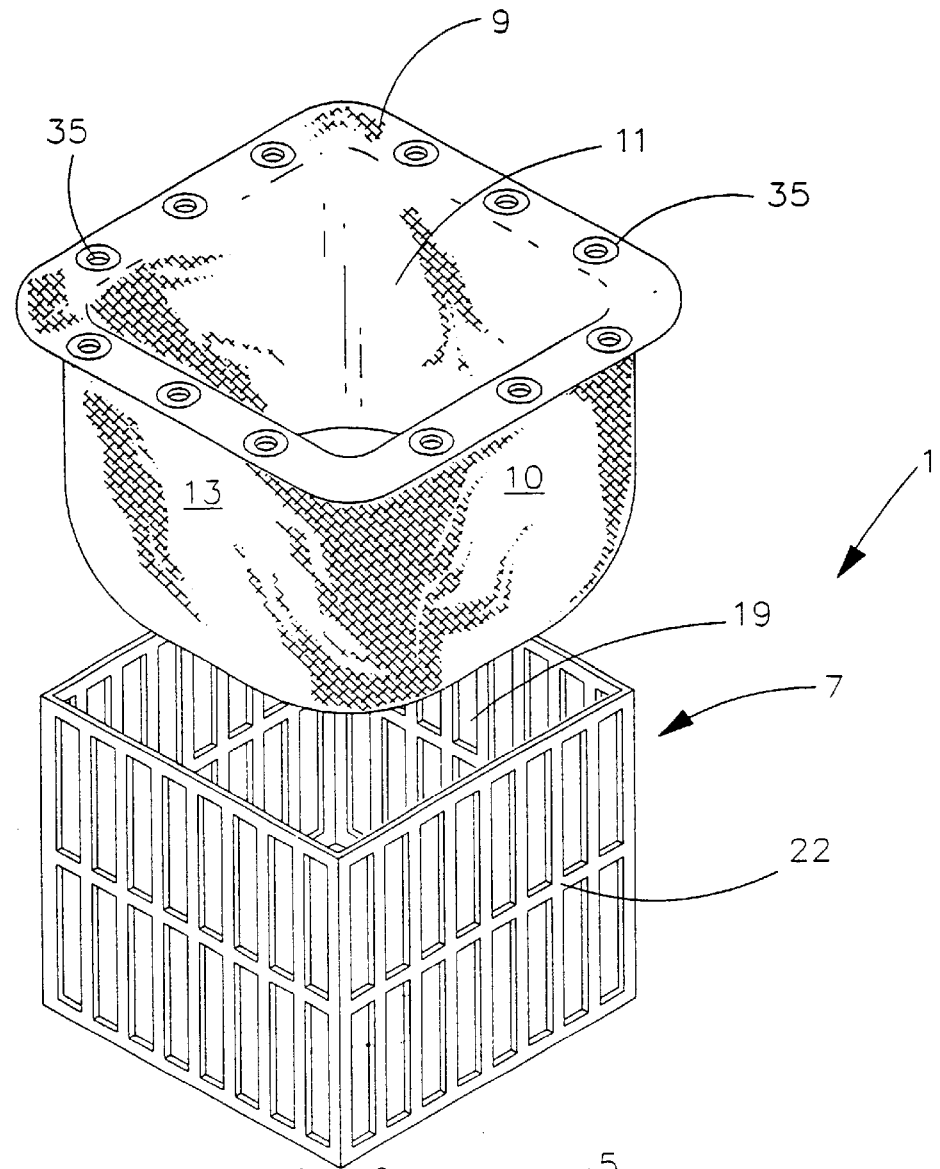
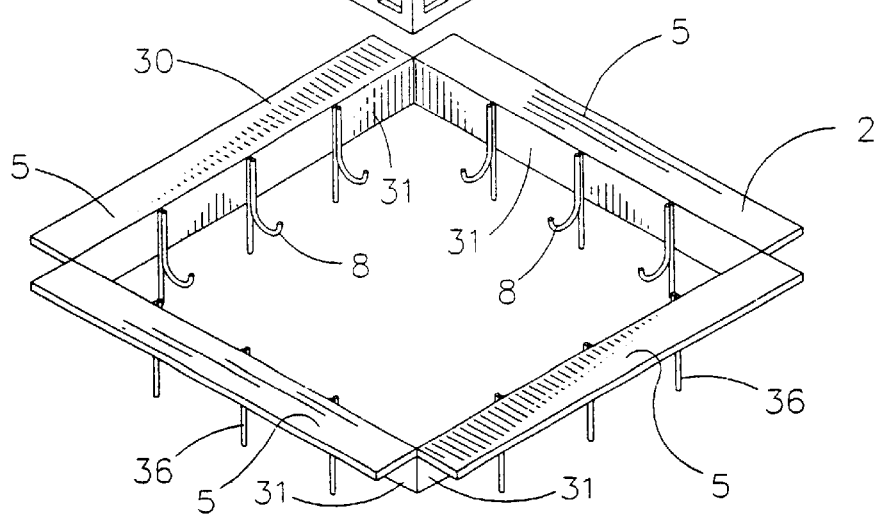
FIGURE 3

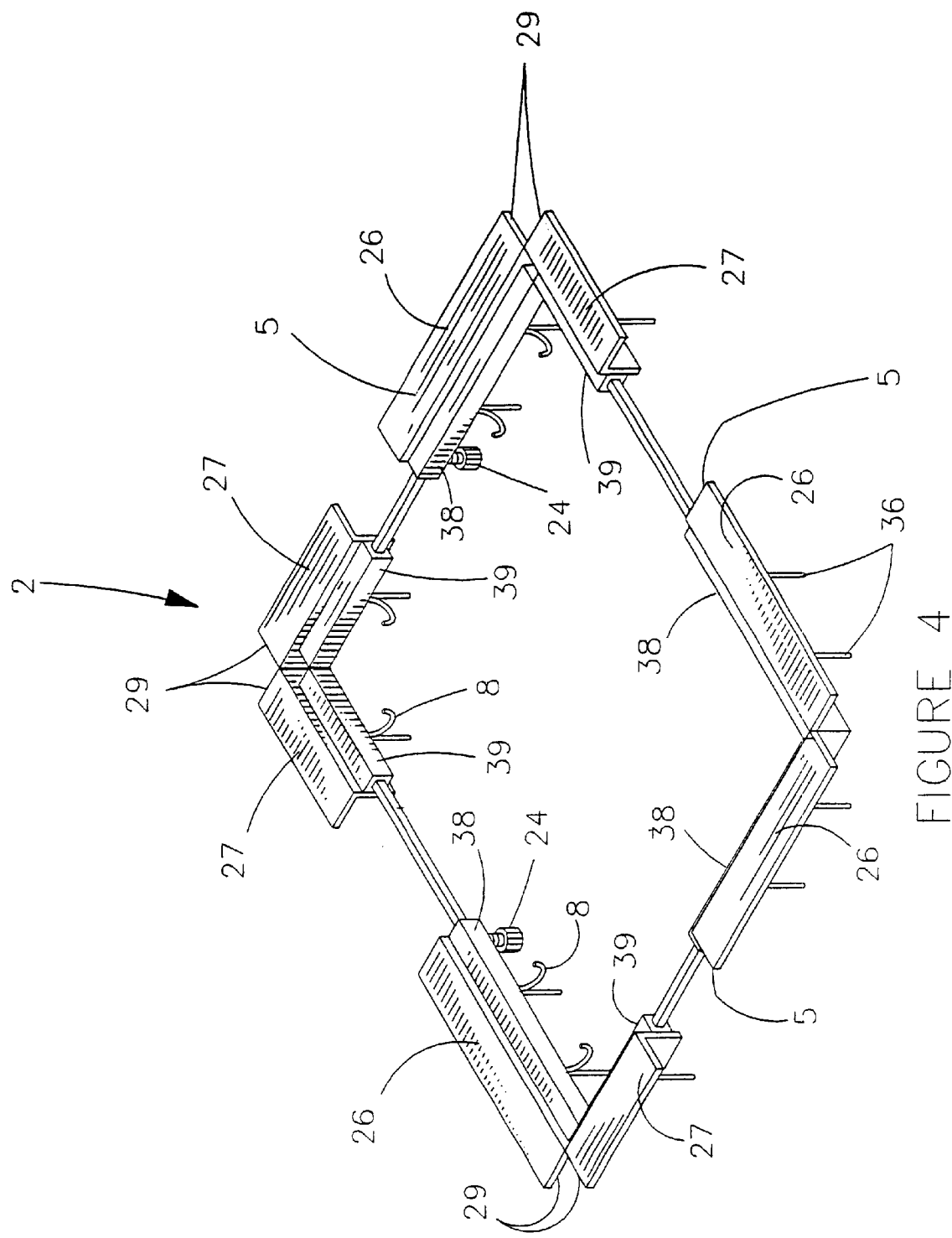

STORM DRAIN LINER

STATEMENT OF PRIORITY

This application is a continuation of Application No. 09/191,358 filed on Nov. 13, 1998, now U.S. Pat. No. 6,086,758.

BACKGROUND OF THE INVENTION

1. Field of the Invention

This invention relates to filtering systems, more particularly filtering systems used in storm drains.

2. Prior Art

Stormwater flows into storm drains, often located on or near a street or highway, and into under ground lines. A problem associated with stormwater run-off is contamination with heavy metals and hydrocarbons which have leaked onto the streets and highways from a variety of sources. Sediment contained in the stormwater run-off also creates problems. Many times the contamination is so high that the storm water discharge exceeds the pollution limits imposed by federal and state laws. Thus, a need exists for a water-filtering device that can filter out heavy metal and hydrocarbon contaminants.

Prior attempts have been made to design filtering systems placed below the surface of the drain within the drain basins. For example, U.S. Pat. No. 4,419,232 to Arntyr et al. discloses a two-tier system whereby a coarse material filter is placed above a finer filtering material. Arntyr et al. discloses that the filter bag disclosed therein is capable of filtering out oil and other viscous impurities from the drain water, but only to a certain extent. As noted by Arntyr et al., the coarse filtering stage is necessary to prevent the filtering bag from breaking when filled with sticks rocks and other debris. U.S. Pat. Nos. 5,372,714 and 5,525,925 to Logue disclose the use of a subsurface filtering system whereby the filter is supported by a series of flaps which are sandwiched between the drain grating and a recess in the catch basin. The problems associated with this device are that the bag is susceptible to breaking for lack of support from below and that the flaps can become dislodged from between the basin recess and drain grating thereby causing the system to become inoperable. A further problem associated with the Logue device is the use of a woven polypropylene material. The woven material and lack of overflow outlets restrict the maximum flow rate through the system to about 40 gallons per minute per square foot and causes water flow to back up during heavy downpours, resulting in flooding around the drain. The use of a woven material also prevents the material from effectively filtering out the heavy metals and hydrocarbons. Thus, a need exists for a filter with increased flow capacity and the ability to filter out heavy metals and hydrocarbons.

The problems associated with the bag filtering systems in the prior art was disclosed ill U.S. Pat. No. 5,643,445 to Billias et al. As noted therein, the prior art filter systems using bags are constructed from material that is susceptible to breaking because of its short lifespan. Furthermore, the systems have no capability to allow storm water out of the system during period of heavy flow, causing flooding in surrounding areas. Applicants note that Arntyr et al. does in fact disclose flaps that open outwards for release of water during downpours. However, because these flaps open outwards, they can allow unfiltered water out of the system even when the filter is not full.

Throughout the United States there are many different sized storm drains, suggesting that a separate system for each size that may be encountered needs to be designed. However, this can become expensive and time consuming. There exists a need for a single storm drain filtering system that can be adaptable to all existing storm drains.

OBJECTS OF THE INVENTION

With the aforementioned considerations in mind, it is therefore an object of this invention to provide a single filtering system that is adaptable to all existing storm drains.

It is a further object to provide a single-stage filtering system whereby heavy metals and hydrocarbons are filtered out of the water.

It is a further object to provide a filtering device that allows discharge of storm water that meets or exceeds state and federal water pollution rules and regulations.

It is a further object to provide a filter that is not susceptible to breaking, while at the same time providing an increased flow rate through the filter.

These and other advantages and objects of this invention shall become apparent from the ensuing description of the invention.

SUMMARY OF THE INVENTION

A method and apparatus for a storm drain filter in a storm drain having an inlet and an outlet which comprises a rigid basket positioned between said inlet and said outlet and a water-permeable filter positioned at least partially within said basket. The invention may also comprise a frame to support the basket and filter in the drain. Methods for installing the apparatus on existing drains and methods for retrofitting existing drains are also disclosed.

BRIEF DESCRIPTION OF THE DRAWINGS

FIG. 3 is an exploded view of the frame, basket and filter of the invention as shown in FIG. 1.

FIG. 4 is a perspective view of a frame having expandable sides.

DETAILED DESCRIPTION OF PREFERRED EMBODIMENTS OF THE INVENTION

Figure 1:
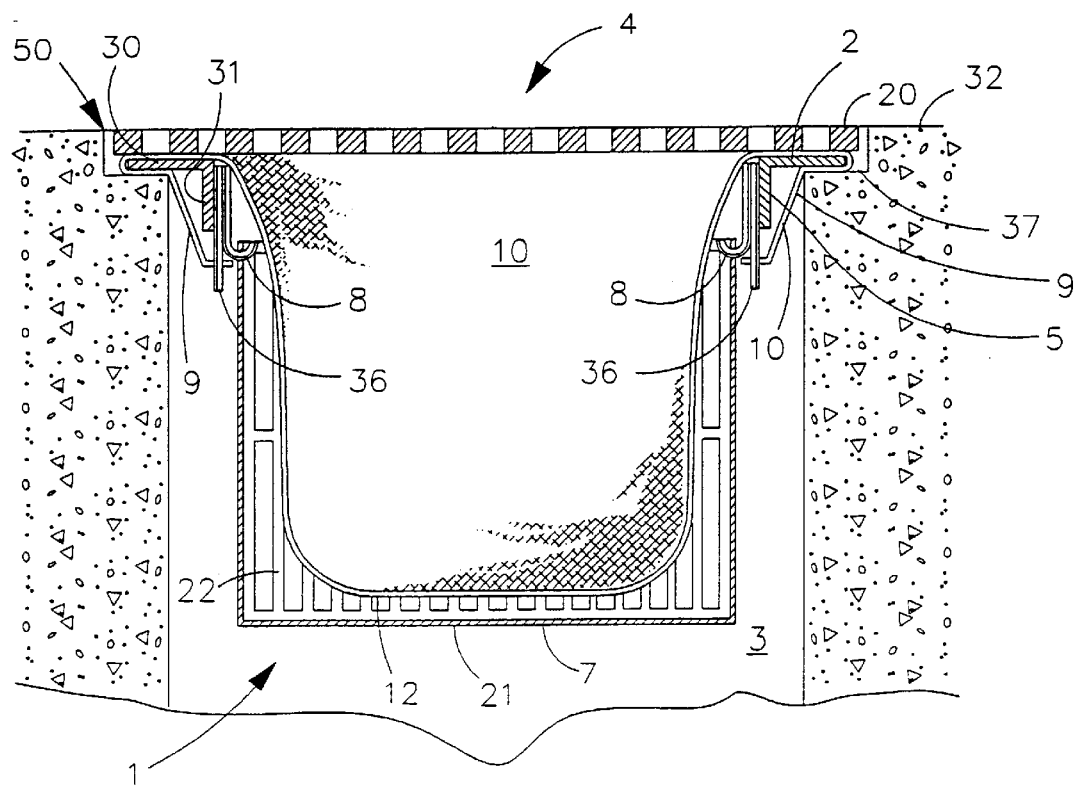
FIG. 1 is a cross-sectional side view of the drain filter apparatus as installed in a storm drain.
Figure 2:
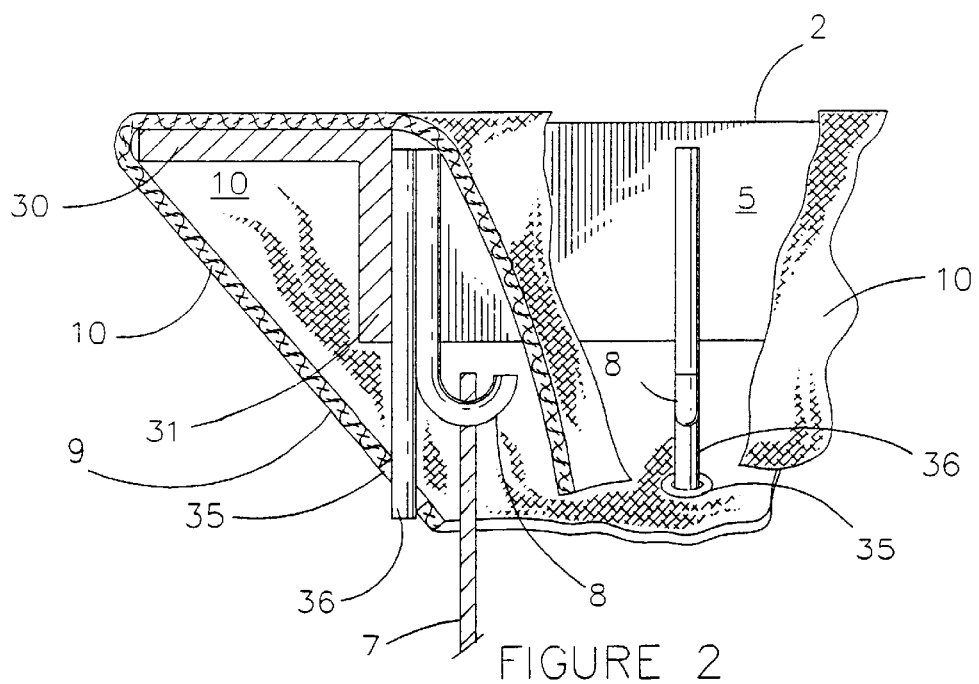
FIG. 2 is a close-up view of the filter and basket connection to the frame.

As shown in FIGS. 1–3, drain filter system 1 comprises, generally, a basket 7 having an open top 19 with a grated bottom 21 and grated side walls 22. Basket 7 is positionable within drain 4 between inlet 50 and an outlet (not shown). As used herein, inlet 50 is the area where liquid first flows into drain 4 from ground level 32. A filter 10 is positionable is least partially within basket 7 so that substantially all water passing through inlet 50 flows through filter 10. Drain filter system 1 may rest on the bottom of the drain (not shown) but is preferably positioned above the drain bottom and the outlet as described herein and shown in the Figures.

Drain filter system 1 comprises a frame 2 positionable within drain 4. Most drains 4 have a recess 37 below ground level 32 where a drain grate 20 rests. Drain grate 20 prevents large objects from falling into drain 4. Frame 2 has sides 5, which are expandable (see FIG. 4) so that system 1 can be easily positioned in nearly all existing drains 4. Sides 5 are preferably flanged members having a vertical wall 31 and a flange 30. Flange 30 rests atop recess 37 below drain grate 20 allowing vertical wall 31 to extend downward into basin 3. A plurality of J-shaped hooks 8 attach to sides 5 along vertical wall 31 and are engageable with basket 7 to suspend basket 7 from frame 2 within drain 4. Frame 2 and its components are preferably constructed of corrosion-resistant material such as stainless steel.

To be expandable as shown in FIG. 4, each side 5 is constructed from a pair of flanged members 26, 27. Telescoping members 38, 39 attach to or are incorporated in flanged members 26, 27 so that the total length of each side 5 is adjustable to fit different sized drains 4. In other embodiments not shown, each side 5 can use a variety of means known in the art so that sides 5 are expandable.

A screw lock 24, or other locking means, is positioned on telescoping members 38, 39 to prevent flanged members 26, 27 from moving relative to one another. The ends 29 of each side 5 are preferably welded to each other, but could be connected using other means well known in the art. In a square or rectangular shaped embodiment, each of the four sides 5 is expandable. Referring, back to FIGS. 1–3, basket 7 is constructed from a corrosion-resistant material, preferably high-density polyethylene, which can support upwards of 5,200 pounds per square foot and should be grated to allow large amounts of water to pass therethrough. This material may be flexible or rigid as long as it can withstand the required forces. A preferred material for basket 7 is TENSAR Structural Geogrid No. UX1600SB, available from Tensar Earth Technologies, Inc. of Atlanta, Georgia. Basket 7 is positioned within drain 4 and attached to frame 2 to suspended basket 7 below frame 2 on J-shaped hooks 8. Basket side walls 22 are aligned so that hooks 8 pass through grated side walls 22 near open top 19. Basket 7 provides support to filter 10 from underneath and keeps filter 10 from breaking after prolonged use or after filter 10 fills with debris. As used herein, "basket" may also include any means of support for filter 10 to prevent filter 10 from bursting and to support filter 10 from below.

Figure 5A:
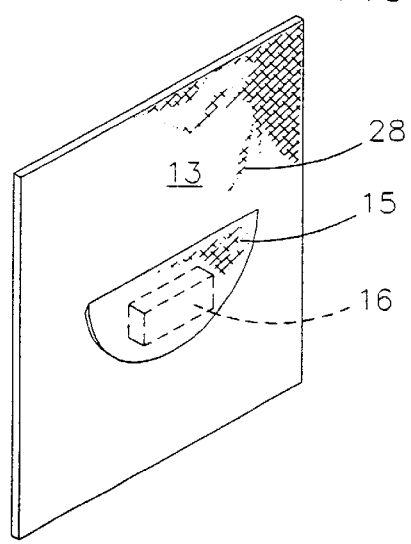
FIGS. 5a and 5b are views of the overflow assembly in the filter.
Figure 5B:
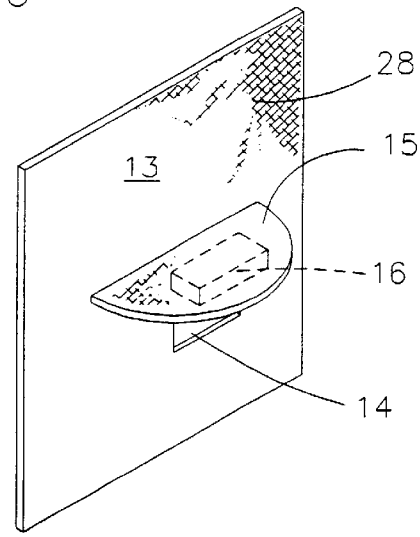

Filter 10 is positioned at least partially within basket 7, but preferably filter bottom 12 rests on basket bottom 21. Filter 10 is constructed to have an open top 11, a closed bottom 12, and side walls 13 extending between top 11 and bottom 12. As shown in FIGS. 5a and 5b, filter 10 also has an opening 14 in one or more side walls 13 for an overflow outlet. A cover 15 is attached to inner side 28 of filter sidewall 13 above opening 14 so that water entering filter 10 will not exit opening 14 unless filter 10 fills rapidly. A float 16 attaches to cover 15 so that when filter 10 fills with water, cover 15 will float upward, allowing excess water to exit system 1 through opening 14.

This insures that system 1 will not back-up during periods of heavy water flow. Preferably, float 16 is sized and shaped to engage opening 14 so that float 16 rests substantially within opening 14 when filter 10 is not full.

Referring back to FIGS. 1–3, filter 10 is supported from above by frame 2 but could attach to basket side walls 22, though not shown. The upper edges 9 of filter 10 wrap over and around frame 2 to ensure that no water entering the system can flow through drain 4 without contacting at least a portion of filter 10. Filter 10 attaches to frame 2, as best seen in FIG. 2, using interlocking male 36 and female 35 members which are correspondingly positioned on upper edge 9 and frame 2. Interlocking male member 36, shown as a rod, attaches to hooks 8 on frame 2 and extends from hook 8. Interlocking female members 35, shown as rings, are positioned within and along upper edge 9. Upper edge 9 is reinforced to prevent rings 35 from tearing away from filter 10. Rings 35 fit over rods 36 and hold filter 10 in place. In other embodiments, other interlocking male 36 and female 35 members may be used and would include snaps, clips, and other fasteners known in the art for fastening or attaching two objects.

Figure 6:
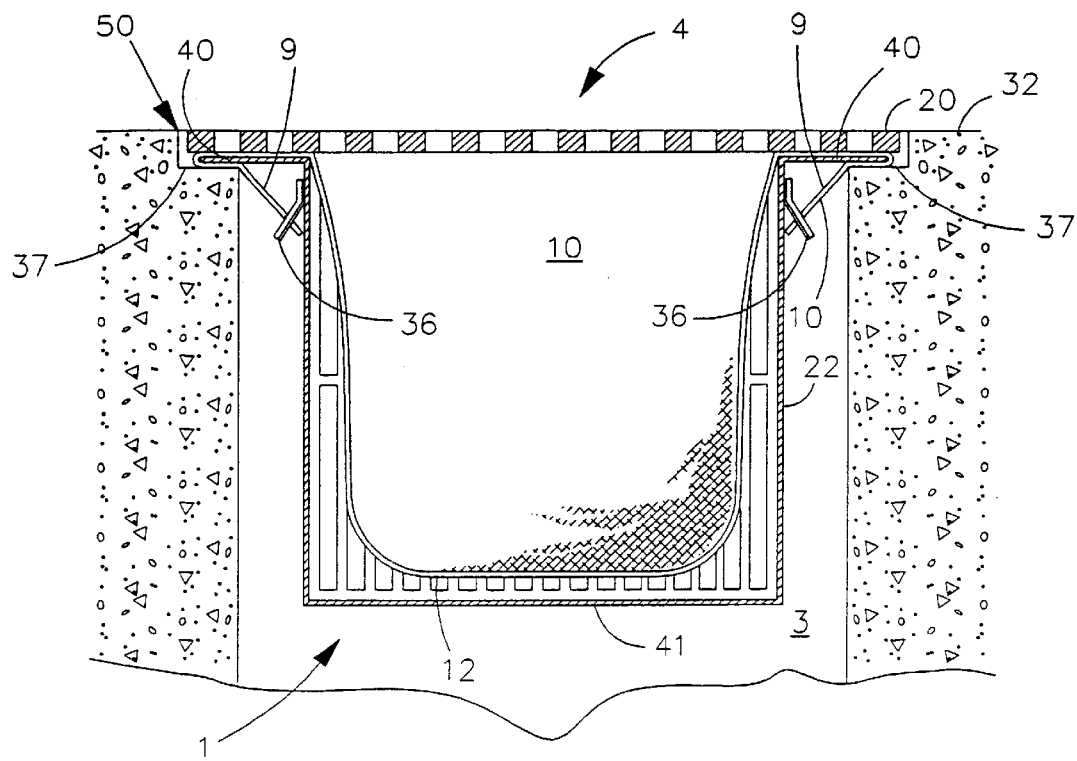
FIG. 6 is a view of an embodiment of the invention wherein the frame and basket are combined into a single member.

In a different embodiment shown in FIG. 6, frame 2 and basket 7 are combined into a single basket member 41. Basket member 41 has an upper section with flanges 40 which rest upon recess 37 and support basket member 41 and a lower grated section. Sides 22 of basket member 41, though not shown, may be constructed to be expandable to fit any size drain 4. Upper edges 9 of filter 10 wrap over and around flanges 40 to ensure substantially all water entering system 1 flows through drain 4 contacts at least a portion of filter 10. Filter 10 attaches to basket member 41 using interlocking male 36 and female members 35 which can be correspondingly positioned on upper edge 9 and basket member 41 and connected as previously described. Basket member 41 is constructed from a metal, a strong polymer, or other material which is corrosion-resistant and able to withstand the forces that a full filter 10 would exert on basket member 41 and flanges 40. Preferably, basket member 41 is constructed from stainless steel.

Figure 7:
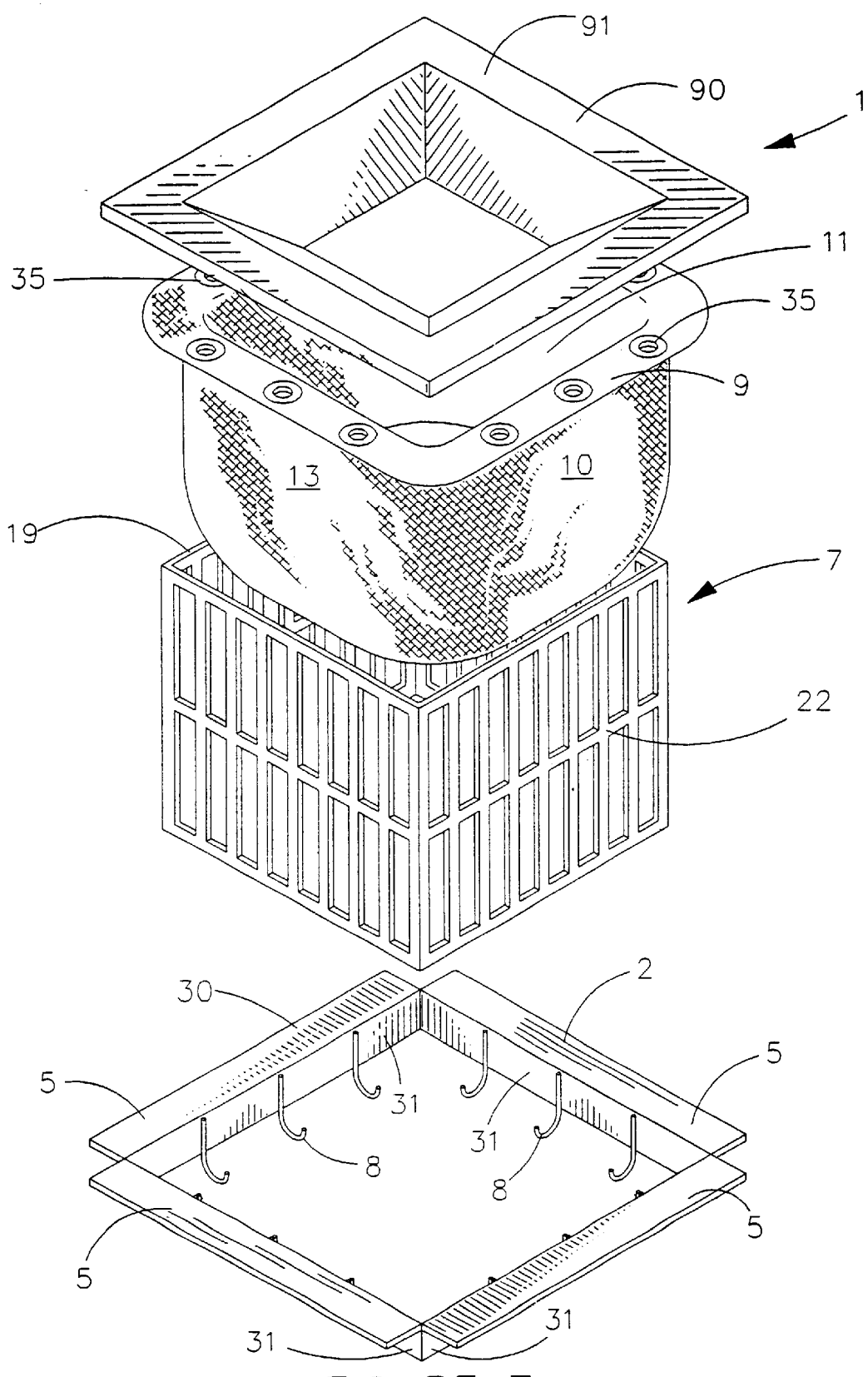
FIG. 7 is an exploded view of an embodiment of the invention wherein both the filter and the basket hang from hooks and a funnel is used to direct fluid into the filter.
Figure 8:
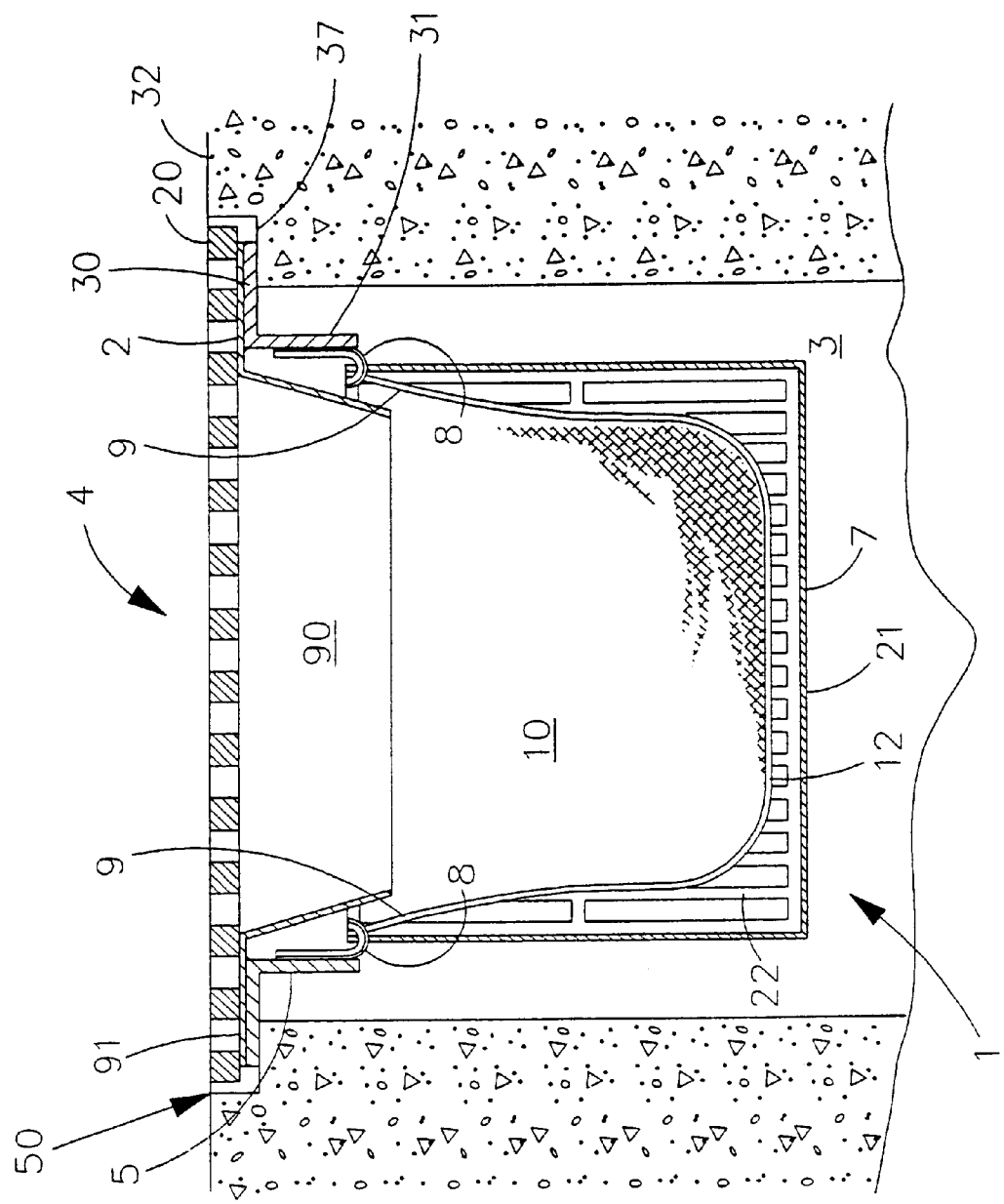
FIG. 8 is the embodiment shown in FIG. 7 as installed in a storm drain.

In the embodiment shown in FIGS. 7 and 8, basket 7 is suspended on hooks 8, and filter 10 is placed within basket 7. Rings 35 are positioned over hooks 8 so that filter 10 is suspended by hooks 8 and extends into basket 7. A funnel 90, having a flanged upper end 91 is positioned atop frame 2 so that funnel 90 is supported atop frame 2 (and hence recess 37) and below drain grate 20. Funnel 90 is configured so that substantially all liquid entering drain 4 is directed into filter 10. Funnel 90 is constructed from a non-corrosive material, preferably high-density polyethylene.

Figure 9B:
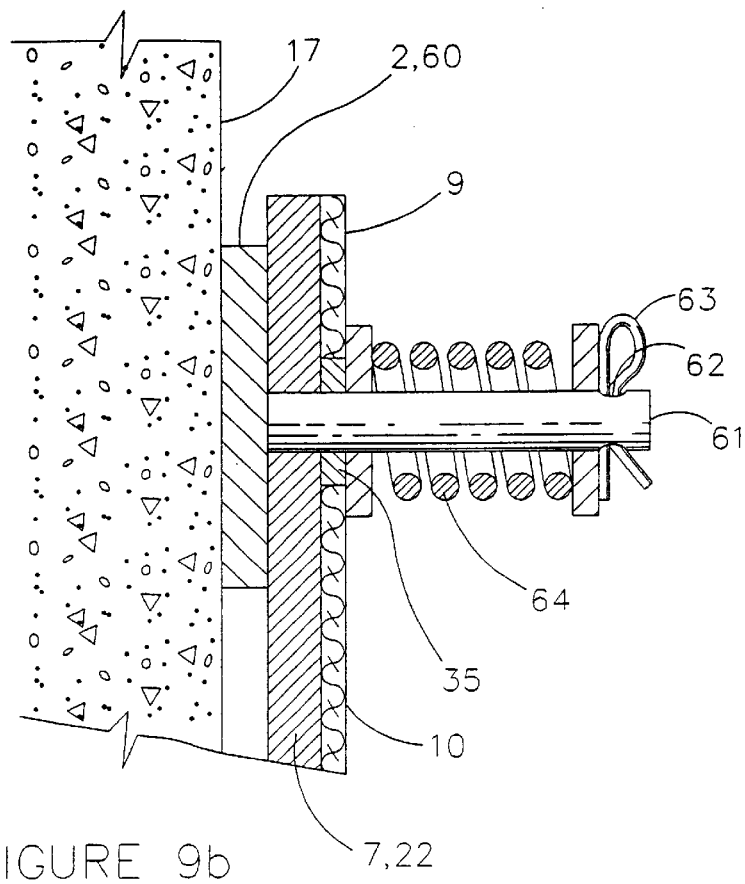
FIGS. 9a–9c are views of an embodiment of the invention as incorporated into a retrofitted drain.
Figure 9A:
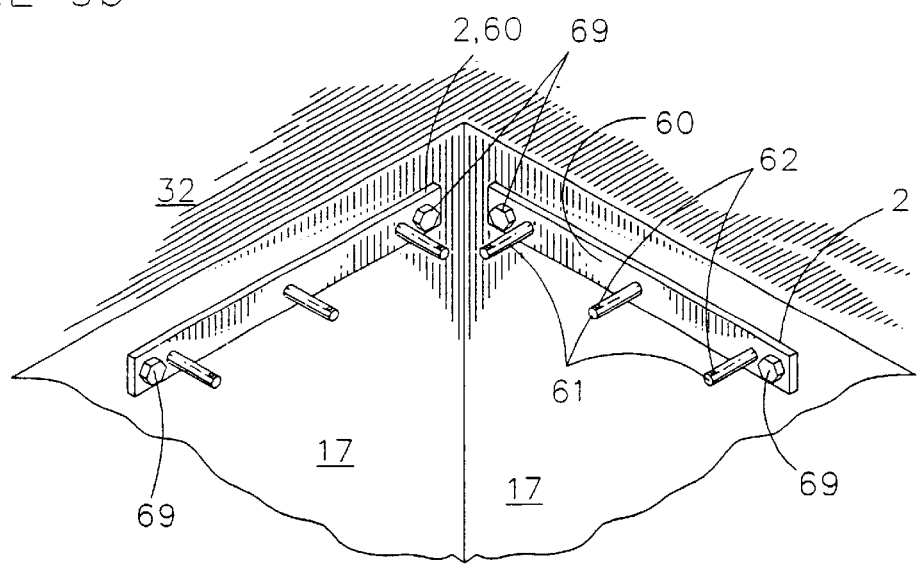
Figure 9C:
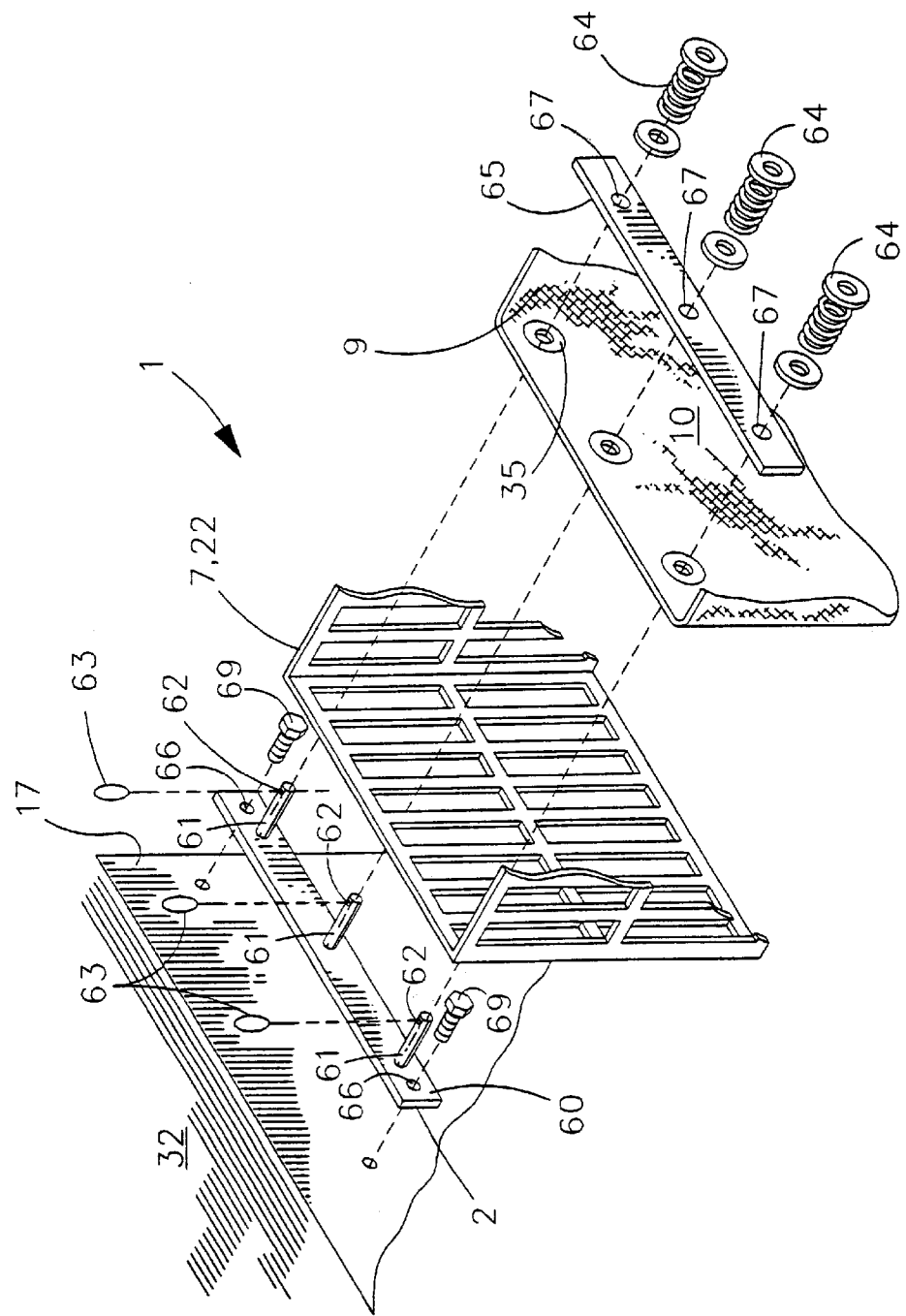

The embodiment shown in FIGS. 9a–9c can be used to retrofit existing drains, especially drains that are not uniform in size. Frame 2 comprises a series of plates 60 which are attachable to drain side walls 17 using any conventional mean known for attaching objects to concrete walls, including bolts 69. Each plate 60 is constructed to have one or more pins 61 fixedly attached thereto and extending therefrom. Each pin 61 is constructed to have an aperture 62 therein at the end of pin 61 opposite plate 60. Plates 60 are preferably constructed from a rigid, corrosion-resistant material, such as stainless steel. Plates 60 are manufactured to fit into a particular drain 4 or are manufactured in 6 to 8 foot lengths and cut on-site. Each plate 60 has a series of apertures 66 therein which allow plate 60 to attach to side walls 17. Once plates 60 are attached to side walls 17, the remainder of system 1 can be installed.

Basket 7 is inserted into drain 4. Pins 61 slide through grated side walls 22 so that basket 7 is suspended from pins 61. Filter 10 is positioned at least partially within basket 7 and rings 35 slide over pins 61 so that filter 10 is supported from above by pins 61 and from the sides and below by basket 7. Plate 65 slides over pins 61 by passing pins 61 through apertures 67 so that filter 10 and basket 7 are sandwiched between plate 60 and plate 65. To hold filter 10 and basket 7 securely on pins 61 so that substantially all water entering drain 4 passes through filter 10, a locking member 64, such as a spring-loaded washer or a pair of washers surround a spring, slides over pins 61 and is compressed past aperture 62. Locking pin 63, which can be a cotter key other means for holding locking member 64 in place, is inserted through aperture 62 so that locking member 64 does not disengage pin 61. Plate 65 insures that uniform pressure is exerted against filter 10 along upper edge 9. In turn, this forces substantially all of the water entering drain 4 through filter 10, with little or no water passing between side wall 17 and filter 10. This embodiment may also incorporate a funnel 90 positioned similar to that previously described.

Filter 10 is preferably constructed from a water-permeable, non-woven polypropylene material, preferably weighing 3–16 ounces per square yard which can be obtained from Synthetic Industries or Carthage Mills, both of South Carolina. Non-woven polypropylene was chosen because non-woven material promotes liquid flow rate much higher (upwards of 200 gallons per minute per square foot) than woven polypropylene (approximately 40 gallons per minute per square foot), without added weight. Polypropylene was chosen for its oleophilic ability to filter out heavy metals and hydrocarbons in the water to a non-detectable level, i.e., a level of less than about one part contaminant per million parts storm water (1 ppm), although in some installations higher limits, such as about 2 ppm are allowable. Other materials which promote the increased flow rates and are able to filter out heavy metals and hydrocarbons to non-detectable levels are also acceptable.

Water flows through the drain grate 20 and into basin 3 where it then flows through filter 10. Both solids, including small sticks, leaves, and dirt, as well as contaminants, including heavy metals and hydrocarbons are filtered out. Because expansion of filter 10 is restricted by basket 7, filter 10 cannot expand and break. At intervals chosen by the user, filter 10 can be emptied or replaced by removing drain grating 20 and lifting filter 10 from basket 7 or by vacuuming filter 10.

Although the preferred embodiment has been described, it will be appreciated by those skilled in the art to which the present invention pertains that modifications, changes, and improvements may be made without departing from the spirit of the invention defined by the claims.

We claim:

1. In a storm drain having an inlet and an outlet, a drain filter apparatus comprising:

a) a basket positionable between said inlet and said outlet;

b) a water-permeable filter positionable at least partially within said basket, said filter comprising an bag having an open top, a closed bottom and sidewalls extending between said top and said bottom; and c) a frame adapted to be fixedly attached to said storm drain between said inlet and said outlet, such that when so attached, said frame is not removable from said storm drain, said basket attachable on said frame.

2. The apparatus according to claim 1 wherein said filter and said frame cooperate, when installed in said storm drain, so that substantially all water entering said storm drain passes through said filter.

3. The apparatus according to claim 1 wherein said basket is constructed from corrosion resistant material.

4. The apparatus according to claim 1 wherein said basket is constructed from polyethylene.

5. The apparatus according to claim 1 wherein said basket has an open top, a grated bottom and at least one grated sidewall.

6. The apparatus according to claim 1 wherein said filter is constructed from a non-woven material.

7. The apparatus according to claim 1 wherein said filter is constructed from an oleophilic material.

8. The apparatus according to claim 1 wherein said filter is constructed from a non-woven oleophilic material.

9. The apparatus according to claim 8 wherein said non-woven oleophilic material has a liquid flow rate of above 200 gallons per minute per square foot.

10. The apparatus according to claim 8 wherein said non-woven oleophilic material is constructed from polypropylene.

11. The apparatus according to claim 8 wherein said non-woven oleophilic material has a liquid flow rate of above 40 gallons per minute per square foot.

12. The apparatus according to claim 8 wherein said non-woven oleophilic material weighs between 3–16 ounces per square yard.

13. The apparatus of claim 8 wherein said non-woven oleophilic material filters out heavy metals and hydrocarbons in water to below allowed discharge levels.

14. The apparatus according to claim 8 wherein said non-woven material is polypropylene.

15. The apparatus according to claim 1 wherein said filter wraps around said frame.

16. The apparatus according to claim 1 further comprising at least one male interlocking member and at least one corresponding female interlocking member, wherein said filter is attachable to said frame using said male and female interlocking members.

17. The apparatus according to claim 1 further comprising a funnel, said funnel positioned to direct fluid into said filter.

18. The apparatus according to claim 1 wherein said filter has at least one overflow outlet.

19. The apparatus according to claim 1 wherein said frame is fixedly attached to said storm drain by bolts.

20. The apparatus according to claim 1 wherein said frame includes a series of plates each fixedly attached to said storm drain.

21. The apparatus according to claim 20 wherein said plates are attached to said storm drain by bolts.

22. The apparatus according to claim 20 wherein said plates have a plurality of pins for supporting said basket.

* * * * *